March 7, 1939.  S. H. TEECE ET AL  2,149,560
VARIABLE SPEED POWER TRANSMISSION MECHANISM
Filed Dec. 22, 1937  3 Sheets—Sheet 1

INVENTOR
S. H. TEECE, DECEASED
By QUEENSLAND TRUSTEES LIMITED, EXECUTOR
By Young, Emery & Thompson
ATTYS.

INVENTOR
S. H. TEECE, DECEASED
BY QUEENSLAND TRUSTEES LIMITED, EXECUTOR
By Young, Emery & Thompson
ATTYS.

March 7, 1939.    S. H. TEECE ET AL    2,149,560
VARIABLE SPEED POWER TRANSMISSION MECHANISM
Filed Dec. 22, 1937    3 Sheets-Sheet 3

INVENTOR
S. H. TEECE, DECEASED
BY QUEENSLAND TRUSTEES LIMITED, EXECUTOR
By Young, Emery & Thompson
ATTYS.

Patented Mar. 7, 1939

2,149,560

UNITED STATES PATENT OFFICE 2,149,560

VARIABLE SPEED POWER TRANSMISSION MECHANISM

Sydney Hassitt Teece, deceased, late of Boulia, Queensland, Australia, by Queensland Trustees Limited, executor, Brisbane, Australia Application December 22, 1937, Serial No. 181,246
In Australia March 2, 1937

11 Claims. (Cl. 74—259)

This invention relates to variable speed power transmission mechanism wherein infinite variations in speed ratio are automatically obtained through the agency of oscillating weights or inertia masses. The invention is particularly applicable to such mechanism of the planetary gear type wherein forces set up by the oscillating weights react upon planetary gears which rotate bodily with a driving casing or member and mesh with a sun or a ring gear on a driven shaft or member.

One of the objects of the invention is to provide an improved mechanism of the kind indicated which is of high efficiency and will rapidly respond in speed ratio according to variations in the speed of the driving member and in the load upon the shaft or part to be driven.

A salient feature of the invention resides in the provision of a loose coupling between the oscillating weights and the respective planetary gears whereby the oscillations of the weights and their periods of reversal may be timed in such a manner that the forces developed by the weights will continuously oppose rolling or planetating movement of the planet gears and will not at any time assist such rolling movement.

Another important feature of the invention involves the provision of a shock absorbing device between the oscillating weights and the planet gears in order to absorb or cushion shocks that would otherwise occur.

The above and other objects and features will be more readily appreciated from the following description relating to certain embodiments of the invention that are at present considered preferable.

But in order that this invention may be better understood reference will now be made to the accompanying drawings which are to be taken as part of this specification and read herewith:

In the following description and the accompanying drawings like numerals are employed to denote similar parts.

Figure 1:
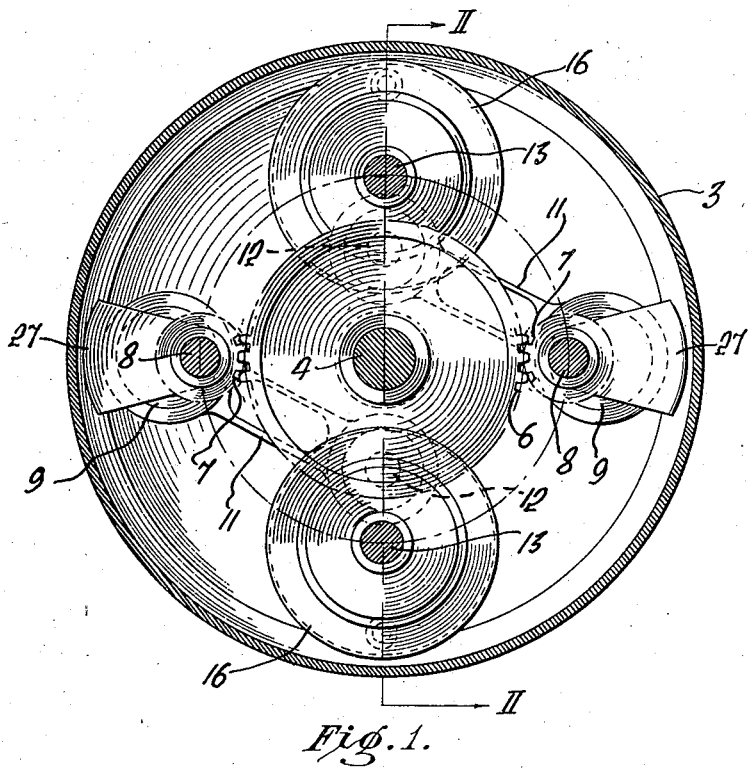
Figure 1 is a face view of mechanism according to one embodiment of the invention, the view being taken on line I—I of Figure 2. Such embodiment is more particularly suitable for application to automobile vehicles.
Figure 2:
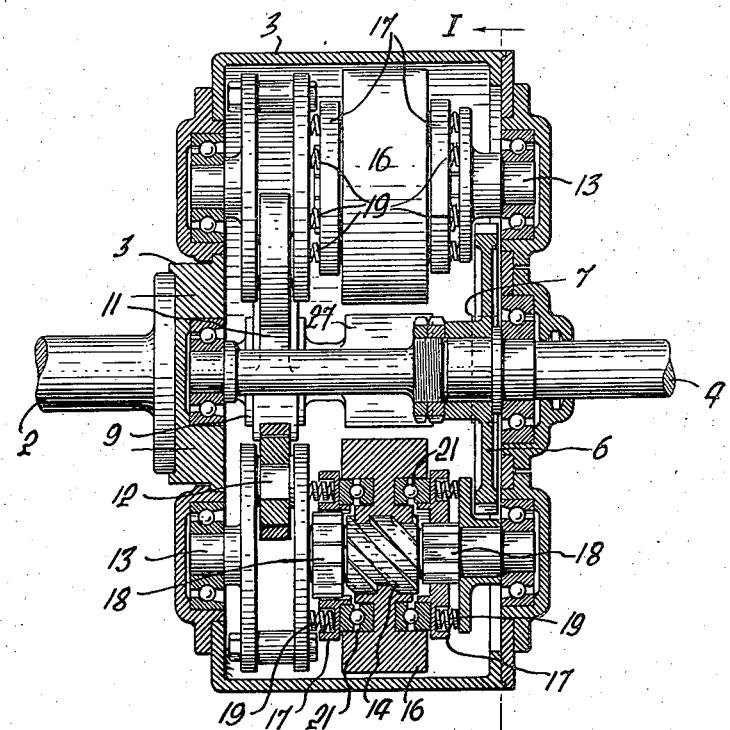
Figure 2 is a longitudinal section taken on line II—II of Figure 1 but with the upper oscillating unit shown in side elevation.

Referring more particularly to Figures 1 and 2 a driving shaft 2 may be made fast to a casing 3 containing the working parts and serving as a flywheel and planet pinion carrier. A shaft 4 to be driven may extend into the casing co-axially with the driving shaft and carry a sun gear 6 with which the planet pinions 7, of which there may be any suitable number, are meshed.

Each planet pinion spindle 8 may be journalled at each end in opposite sides of the casing 3 and provided with an eccentric 9 encircled by one end of a connecting rod 11. The other end of this rod is connected to a crank pin 12 of a crankshaft 13 that extends parallel with the planet pinion spindle and may be likewise journalled in opposite sides of the casing.

Disposed about each crankshaft and loosely connected thereto as by helical threads or splines 14 is a weight 16 that may take the form of circular block preferably concentric with the crankshaft and having a threaded bore corresponding to the helical splines.

Rolling of the planet pinions around the sun gear is converted by the respective connecting rod and crank pin into oscillating rotary motion of the crankshaft 13 whereby the associated weight 16 in addition to being oscillated tends to be displaced alternately in opposite directions along the helically splined portion of the crankshaft.

Figure 6:
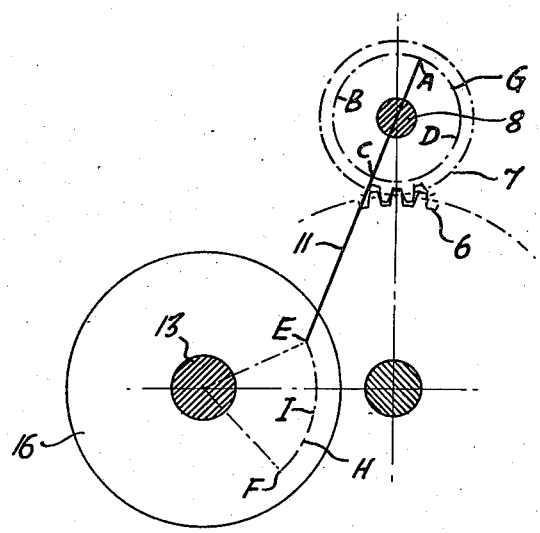
Figure 6 is a diagram illustrating the operating principle of the invention.

The forces set up by the oscillating weights and their re-action upon the planet pinions will be better appreciated from the following description in conjunction with the diagram of Figure 6 wherein G represents the circle described by the centre of the eccentric 9 on one of the planet pinion spindles 8 and H represents the arc described by the oscillating end of the connecting rod 11.

Movement of the rotary end of the connecting rod from A to B causes a corresponding movement of the oscillating end of the connecting rod from E to I, with rapid acceleration of the weight 16. Movement from B to C causes a correspondingly retarded movement from I to F. Now if the weight 16 was rigidly connected to the crank shaft 13 the energy transferred from the planet pinion 7 to the weight during acceleration would be returned to the planet pinion during retardation. As before mentioned, however, the weight is not rigidly connected to the crankshaft, but is loosely connected thereto, through the medium of helical splines. This loose connection produces the following results:

Movement from A to B produces acceleration of weight 16, and requires a transfer of energy from planetary spindle 8 to the weight, the latter at this stage, moving at maximum speed. Movement from B to C does not retard the weight because it is free to move around the crankshaft 13 and, due to this freedom of movement, retardation does not take place until movement from C to D has commenced, so that a further transfer of energy from the planetary spindle 8 to the weight 16 takes place and it will be noted that none of this energy is at any time returned.

To sum the operation up, from A to B and from C to D the weight is both accelerated and retarded, demanding a continuous transfer of energy from planetary spindle 8 to weight 16, and, as from B to C and D to A the weight is, in effect, dissociated from the planetary spindle due to the weight's freedom of movement on the crank shaft through the helical splines, there cannot be any return of energy. It follows that the reactions set up by the momentum and inertia of the weight do not at any time assist rolling of the planet pinion but continuously oppose such movement.

It is desirable that a suitable form of resilience be associated with the respective weights so that their repeated reversals of movement will not create shocks. This may be effected in a variety of ways. For example, two collars 17 (Figure 2) adapted to slide axially upon the crankshaft 13, as by means of feather keys or straight splines 18, one at each side of each weight may be yieldingly urged towards the weight by a spring or a series of springs 19. A thrust bearing 21 should preferably be interposed between each sliding plate and the weight.

Figure 4:
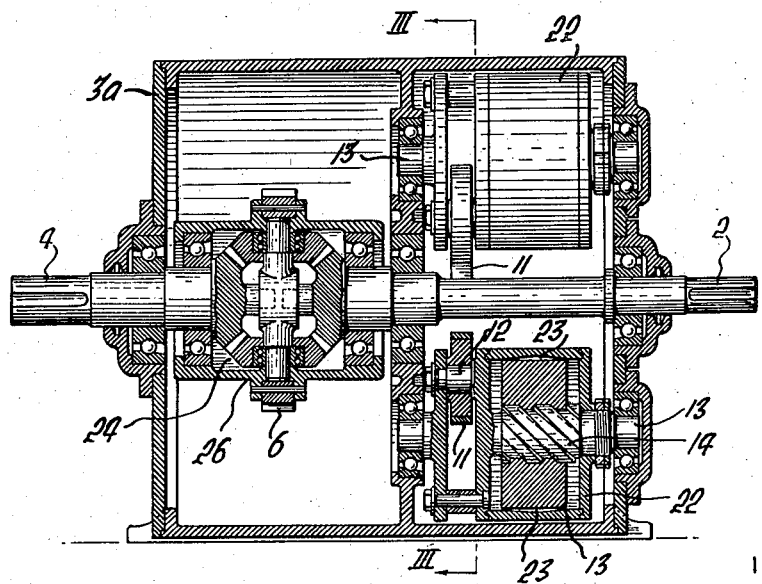
Figure 4 is a longitudinal section taken on line IV—IV of Figure 3 but with the upper oscillating unit shown in side elevation.

According to another example hydraulic action may be relied upon to absorb shocks. Thus as seen in Figure 4 each weight 13 may be enclosed in an oil tight drum 22, the internal periphery of which is tapered so as to increase in diameter at or about its centre and provide around the weights, a narrow annular space 23 that progressively increases in area from the ends towards its centre. At each reversal of movement of the oscillating shaft 13 the weight is blocked by the main bodies of oil at the sides of the weight, the tapering annular oil space between the weight and its drum tending to maintain the weights in a central position. Any variation from such central position automatically produces an increase in oil pressure at one side of the weight and a decrease at the opposite side.

In either of the two examples referred to the correct timing of the movements of the weights including their periods of reversal may be arrived at or adjusted by permitting the weights to have a certain amount of positively free movement before the shock absorber comes into action.

Figure 3:
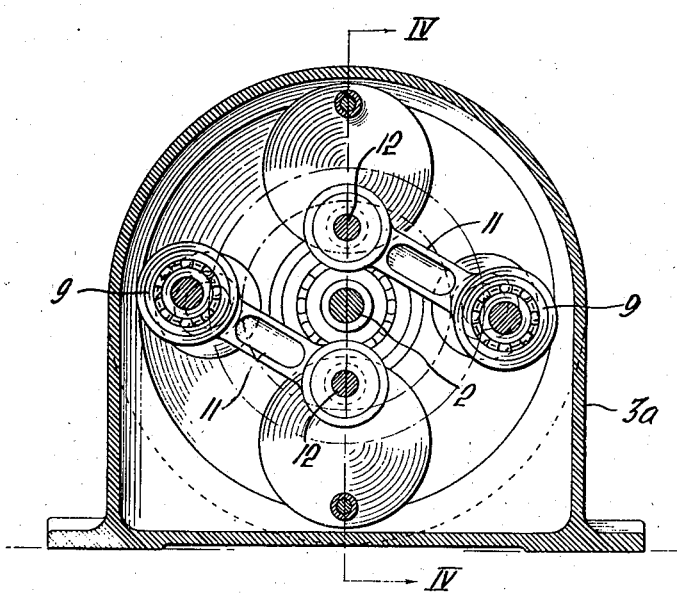
Figure 3 is a face view illustrating another embodiment of the invention, the view being taken on line III—III of Figure 4. This embodiment is more particularly suitable for non-mobile apparatus.
Figure 5:
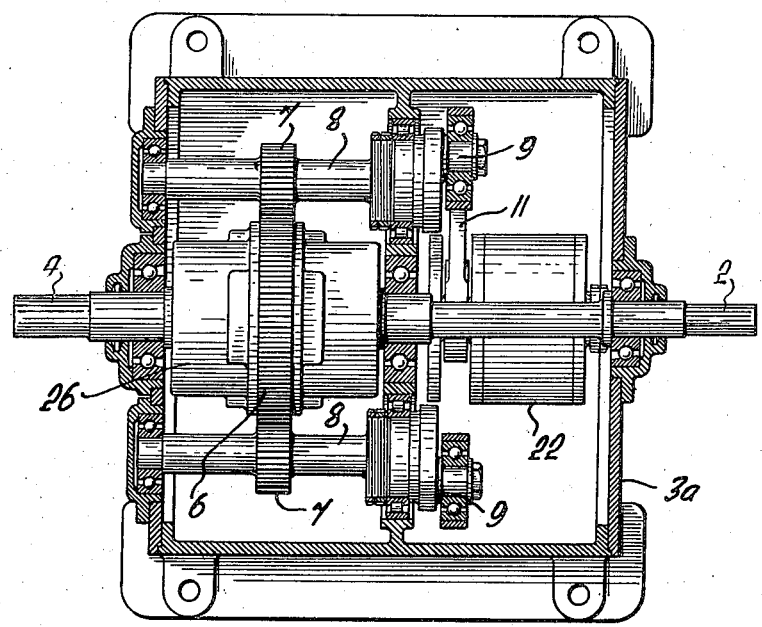
Figure 5 is a part sectional plan view of Figure 4.

The embodiment illustrated in Figures 1 and 2 is considered to be more particularly applicable for automobiles but the same principles may be embodied for general industrial purposes. In such cases however, certain modifications may be desirable. Thus for instance, with reference to Figures 3, 4, and 5, instead of the drive being taken through a rotating casing, the casing 3a may be designed to remain stationary. In such an instance there is interposed between the driving shaft 2 and the driven shaft 4 a conventional or suitable differential mechanism 24 the case 5 or cage 26 of which has affixed thereto the sun gear 6 with which the planet pinions 7 are meshed.

If rotation of the driven shaft 4 is subject to resistance or load, the rotation of the driving shaft causes the differential case and gear to rotate which, in turn, brings the oscillating weights and associated parts into action setting up forces that oppose rotation of the differential gear and react upon the driven gear 6 and shaft 4.

According to the preceding description the oscillating weights are concentric with their shafts and although this is preferred they may if so desired be eccentrically mounted in which event the centrifugal force developed thereby could be utilized to assist momentum and inertia in opposing rolling movements of the patent pinions.

In order to maintain a top gear or direct drive position in the rotating case embodiment (Figures 1 and 2) additional weights 27 may be attached to the planet pinion spindles and disposed eccentric thereto. Once the direct drive position is departed from and the planet pinion spindles with their weights rotate, the force exerted by these weights due to centrifugal action is balanced out.

Having now described the invention what is claimed as new and desired to secure by Letters Patent is:

1. In variable speed power transmission mechanism, a driving member, a planet gear, a driven gear meshing with said planet gear, a shaft, a connecting rod operatively connected between said planet gear and said shaft so as to cause the latter to oscillate during planetary movement of the planet gear, a weight or inertia body disposed about said shaft, and loose coupling means connecting said weight to said shaft so that the weight oscillates with the shaft but is free during a portion of each stage or stroke of each complete oscillation to turn in relation to the shaft, whereby the reactions set up by the momentum and inertia of the weight continuously oppose rolling or planetary movement of the planet gear.

2. In variable speed power transmission mechanism, a driving member, a planet gear, a driven gear meshing with said planet gear, an eccentric associated with said planet gear, a crankshaft, a connecting rod extending between said eccentric and said crankshaft so as to oscillate said crankshaft during planetary movement of the planet gear, a weight or inertia body disposed about said crankshaft, and screw means connecting said weight to said crankshaft so that during oscillation of the latter the weight tends to be displaced helically about the shaft, whereby the reactions set up by the momentum and inertia of the weight continuously oppose rolling or planetary movement of the planet gear.

3. In variable speed power transmission mechanism, a driving member, a planet gear, a spindle fast with said planet gear, an eccentric on said spindle, a driven gear meshing with said planet gear, a crankshaft, a connecting rod extending between said eccentric and crankshaft so as to oscillate said crankshaft during planetary movement of said planet gear, a weight or inertia body disposed about said crankshaft, a loose coupling including screw means connecting said weight to said shaft so that during oscillation of the latter the weight is constrained to displacement helically of the shaft, and means yieldingly opposing the helical movement of the weight, for the purpose specified.

4. In variable speed power transmission mechanism, a driving member, a planet gear, a spindle fast with said planet gear, an eccentric on said spindle, a driven gear meshing with said planet gear, a crankshaft, a connecting rod extending between said eccentric and crankshaft so as to oscillate said crankshaft during planetary movement of said planet gear, a weight or inertia body disposed about said crankshaft, screw means connecting said weight to the crankshaft so that during oscillation of the latter the weight is constrained to move helically of the shaft, and means disposed at each side of the weight for yieldingly opposing its helical movement.

5. In variable speed power transmission mechanism, the combination claimed in claim 1 and including means yieldingly opposing turning movement of the weight relative to said shaft.

6. In variable speed power transmission mechanism, the combination claimed in claim 1 wherein said loose coupling means is constituted by providing said shaft with a screw threaded or helically splined portion, and by providing said weight with a bore that is adapted to co-operate with said screw threaded or splined portion of the shaft whereby said weight is caused to move helically about the oscillating shaft, means being provided for yieldingly opposing such movement of the weight.

7. Variable speed power transmission mechanism, comprising, a driving member, planet gears rotating bodily with said driving member, a driven gear meshing with said planet gears, a shaft for each planet gear, a connecting rod for each shaft and planet gear operatively connected between the two parts so as to cause the shafts to oscillate during planetary movement of the planet gears, weights disposed about said shafts, and loose coupling means connecting said weights to the respective shafts so that each weight oscillates with its shaft but is free during a portion of each stage or stroke of each complete oscillation to turn in relation to its shaft.

8. In variable speed power transmission mechanism, the combination claimed in claim 1 and wherein said planet gear rotates bodily with said driving member.

9. In variable speed power transmission mechanism, the combination claimed in claim 1 and including a weight fast with the planet gear and disposed eccentric thereto, for the purpose specified.

10. In variable speed power transmission mechanism, the combination claimed in claim 1 and including a driven shaft, and a differential device operatively interconnected between said driven shaft and said driving member, said differential device having a casing to which said driven gear is made fast.

11. Variable speed power transmission mechanism, comprising a driving shaft, a driven shaft, a differential device interconnecting said shaft, a toothed wheel fast with the case of said differential device, planet pinions meshing with said toothed wheel, a crankshaft for each planet pinion operatively connected between the two parts so as to cause the crankshafts to oscillate during rotation of the planet pinions in relation to said toothed wheel, weights disposed about said crankshafts, and loose coupling means connecting said weights to said crankshafts so that each weight oscillates with its crankshaft but is free during a portion of each stage or stroke of each oscillation to turn in relation to its crankshaft.

QUEENSLAND TRUSTEES LIMITED,
By CHARLES ROBERT HAMILTON,
                            Secretary,
Executor of the Estate of Sydney Hassitt Teece, Deceased.